United States Patent [19]
Duggan

[11] Patent Number: 5,109,469
[45] Date of Patent: Apr. 28, 1992

[54] PHOSPHOR SCREEN FOR CORRECTING LUMINOUS NON-UNIFORMITY AND METHOD FOR MAKING SAME

[75] Inventor: Daniel D. Duggan, Roanoke, Va.
[73] Assignee: ITT Corporation, New York, N.Y.
[21] Appl. No.: 607,699
[22] Filed: Nov. 1, 1990
[51] Int. Cl.⁵ ............................................. G02B 6/00
[52] U.S. Cl. ................................. 385/146; 313/372
[58] Field of Search ............... 350/96.10, 96.24, 96.25, 350/96.26, 96.27; 313/372, 372, 466

[56] References Cited

U.S. PATENT DOCUMENTS

| | | | |
|---|---|---|---|
| 3,977,855 | 8/1976 | Cole | 350/96.25 X |
| 4,656,562 | 4/1987 | Sugino | 350/286 X |
| 4,821,114 | 4/1989 | Gebhardt | 350/96.25 X |
| 4,904,049 | 2/1990 | Hegg | 350/96.27 |
| 4,909,609 | 3/1990 | McDowell | 350/96.27 |
| 4,932,752 | 6/1990 | Krashkevich et al. | 350/96.27 X |

*Primary Examiner*—John D. Lee
*Assistant Examiner*—Phan T. Heartney
*Attorney, Agent, or Firm*—Arthur L. Plevy; Patrick M. Hogan

[57] ABSTRACT

To correct luminous non-uniformity of light provided by a phosphor screen, the phosphor efficiency is varied across the diameter of the phosphor screen. A material that reduces the efficiency of phosphor is deposited on the face of the phosphor screen, such that the material compensates for the luminous non-uniformity and provides a uniform distribution. The material, which can be aluminum, is deposited onto the phosphor screen by a evaporation process.

19 Claims, 3 Drawing Sheets

PHOSPHOR SCREEN FOR CORRECTING LUMINOUS NON-UNIFORMITY AND METHOD FOR MAKING SAME

BACKGROUND OF THE INVENTION

The present invention relates in general to a phosphor screen, and in particular to a phosphor screen that corrects luminous non-uniformity in an image intensifier and to a method of making such a screen.

Image intensifiers are well known for their ability to enhance night-time vision. The image intensifier multiplies the amount of incident light received by it to produce a signal that is bright enough for presentation to the eyes of a viewer. For instance, the U.S. military uses image intensifiers during night-time operations for aiming at targets that otherwise would not be visible.

A prior art image intensifier 10 is shown in FIG. 1. An objective lens 12 focuses electromagnetic radiation from a distant object 14 onto a photocathode 16. The electromagnetic radiation can be in the visible spectrum or in the invisible spectrum. The photocathode 16 converts the electromagnetic radiation into an electron emission. A microchannel plate (MCP) 18 amplifies the electron emission by increasing the electron density of the electron emission, which increases brightness. A phosphor screen 20, deposited on the back of a fiber optics element 22, converts the amplified electron emission into visible light. The fiber optics element 22 transmits the light to an observer 24. The object is inverted when it reaches the photocathode 16, and therefore the image provided by the phosphor screen 20 is also inverted.

In certain image intensifiers, it is desirable to invert the inverted image before it is viewed. One method of inverting the image is to follow the fiber optics element 22 with a lens assembly. A far more advantageous method, however, is to twist the fiber optics element 22. The twisted fiber optics element 22, more commonly known as a "twister", is created by twisting a fiber optic bundle such that the input image, which falls on the input plane, is inverted by 180 degrees when the input image finally reaches the output plane 23.

The twister offers several advantages over the lens assembly. For instance, the twister consumes less space, because inversion can be accomplished over a shorter distance. The twister also offers a sharper image than the lens assembly. The twister is more convenient to use, since a fiber optics element 22 already forms a part of the image intensifier. And, unlike the lens assembly, the twister cannot be knocked out of alignment.

There is a disadvantage to twisting the fiber optics bundle, however. By twisting the bundle, a longer optical path is produced along the outer fibers than along the central fibers. The longer optical path in the longer fibers attenuates light more than the shorter optical path in the shorter fibers, thereby causing a gradient in luminosity between an edge of the twister and the center of the twister. For example, the transmission efficiency of an optical signal at the center of the twister may range between 75 and 80 percent, whereas the transmission efficiency of an optical signal at the edges may range between 55 and 60 percent. Therefore, the fiber optics transmits light having a gradient of luminosity.

The prior art is aware of apparatus methods and for correcting luminous non-uniformity caused by a twister. For instance, in U.S. Pat. No. 4,932,747, entitled "FIBER BUNDLE HOMOGENIZER AND METHOD UTILIZING SAME" and issued to Stephen Russell and George Imthurn on 12 Jun. 1990, a fiber optics element is employed to homogenize the non-uniform intensity profile of an excimer laser. An anti-reflective coating is deposited at the input faces of the input ends of the filaments, which form the fiber optics element. The input ends receive a beam from the excimer laser, and a uniform intensity profile is produced is provided at the output ends.

In U.S. Pat. No. 3,977,855, entitled "METHOD OF MAKING FIBER OPTIC DEVICE" and issued to Henry Cole on Aug. 31, 1976 and assigned to American Optical Corporation, fiber stretching in the twister is minimized. A fiber optics bundle, having its image-receiving and emitting faces arranged in identical geometrical patterns, is formed by heat softening its intermediate section, twisting the bundle by 180° and then compressing the bundle in the axial direction.

In U.S. Pat. No. 4,656,562, entitled "OPTICAL INTEGRATOR MEANS FOR INTENSITY MODIFICATION OF GAUSSIAN BEAM" and issued to Paul Sugino on 7 Apr. 1987, and assigned to Santa Barbara Research Center, discloses an integrator rod that effectively inverts the cross-sectional intensity of a beam having a generally Gaussian intensity distribution. The integrator rod is made of an optically transmitting material and has a faceted entrance face and an exit face having a different geometry. The light beam has a generally uniform intensity distribution as it leaves the exit face of the rod.

In U.S. Pat. No. 4,360,372 entitled "FIBER OPTIC ELEMENT FOR REDUCING SPECKLED NOISE", issued to Roman Maciejko on 23 Nov. 1982 and assigned to Northern Telecom Limited, a fiber optics element has a bundle of filaments with different refractive indices. The refractive indices vary the lengths of the optical paths of the respective filaments.

SUMMARY OF THE INVENTION

The present invention relates to an improved apparatus for converting an electron emission into visible light, and to a method for manufacturing the improved apparatus. In apparatus that includes a fiber optics element having an input plane and an output plane, and a phosphor screen deposited on the input plane, the light produced by the phosphor screen has a luminous non-uniformity at the output plane. The improvement to the apparatus is a film of material that is deposited on the phosphor screen and that reduces phosphor efficiency, such that the material compensates for the luminous non-uniformity. The improved apparatus is manufactured by depositing the material on the phosphor screen.

DETAILED DESCRIPTION OF THE EXEMPLARY EMBODIMENTS

Although the present invention is applicable to any type of system that uses a phosphor screen to convert electron emissions to visible light, it is especially suitable for use with image intensifiers. Accordingly, the present invention will be described in connection with an image intensifier.

Figure 1:
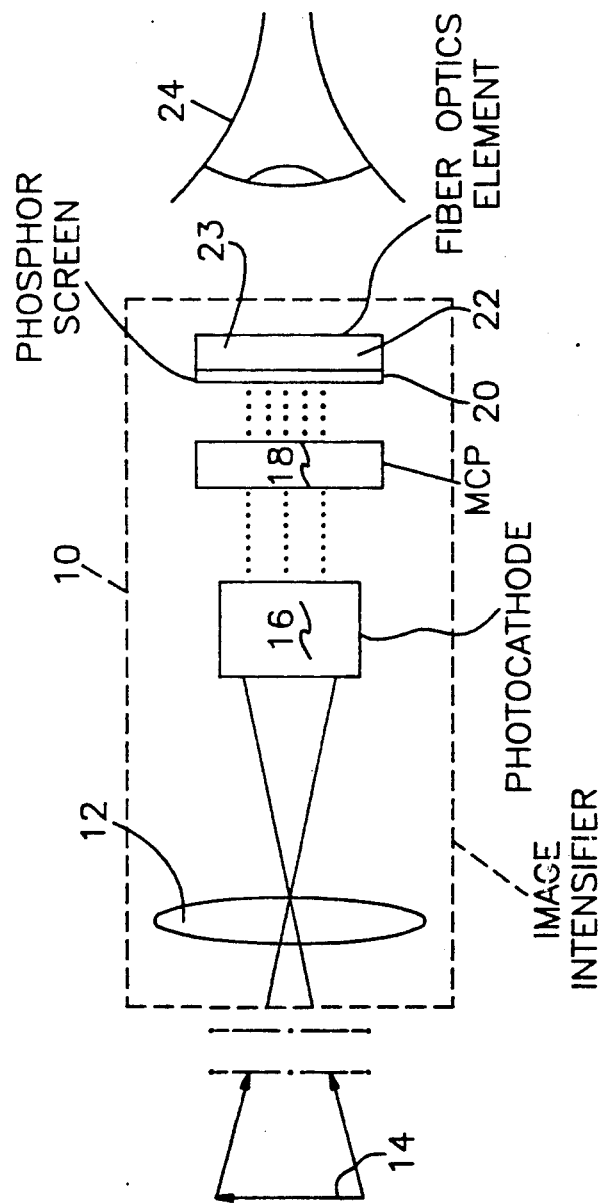
FIG. 1 is a schematic diagram of a prior art image intensifier.

Referring once again to the image intensifier 10 illustrated in FIG. 1, the phosphor screen 20 of the image intensifier 10 converts electrons emitted by the photocathode 16 and amplified by the microchannel plate 18 into visible light. If the fiber optics element 22 is a twister, there will be a greater attenuation of light than if the fiber optics element 22 is a straight-through type, in which all the fibers of the fiber optics element 22 are straight and approximately of the same length. In either case, the light at the output plane 23 of the fiber optics element 22 will have a non-uniform luminosity. It should be noted, however, that other sources contribute to the non-uniform luminosity at the output plane 23 of the fiber optics element 22. For instance, a tilt in spacing of an element (i.e. photocathode 16, microchannel plate 18, twister 22) or even a slight wedge shape in the thickness of the microchannel plate 18 can affect luminosity. Also, impurities in or non-uniformity of the phosphor coat on the fiber optics element 22 can also cause non-uniformity in luminosity.

Figure 2:
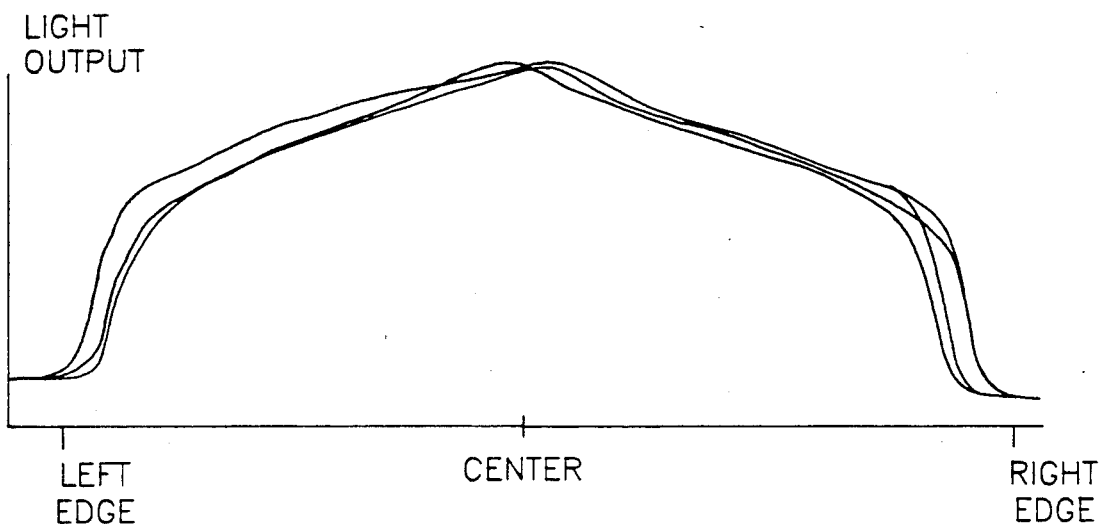
FIG. 2 is a graph of the gradient of luminosity for a prior art image intensifier.

In FIG. 2, there is shown a graph of luminous non-uniformity at the output plane 23 of a fiber optics element 22. The graph will be discussed in connection with two Generation III intensifier tubes, each of which employ a gallium arsenide photocathode, and each of which are manufactured by ITT Electro-Optical Products Division in Roanoke, Va. The ordinate of the graph refers to relative light output, and the abscissa refers to the diameter of the fiber optics element 22 at the output plane 23. The light output is measured, for instance, by passing a photometer across the diameter of the fiber optics element 22 at the output plane 23. Derived from the graph is a luminous uniformity ratio, which is a ratio of the highest light output over the lowest light output. This ratio provides is an index of luminous non-uniformity.

In the Generation III image intensifier Anvis tube Ser. No. 40823, in which the fiber optics element 22 is a twister, the luminous uniformity ratio was measured for an infra-red light input. The peak light output occurred in the center with a relative light output of 3.0. The left edge showed a relative light output of 1.3 for a luminous uniformity ratio of 2.3. The luminous uniformity ratio for a white light input was only slightly better.

By contrast, the luminous uniformity ratio of the Generation III image intensifier PVS-7 Ser. No. 113109 was near unity. The fiber optics element 22 of this image intensifier is a straight-through type. Although there was a marked improvement in center-to-edge uniformity, there was slight side-to-side non-uniformity.

Figure 3:
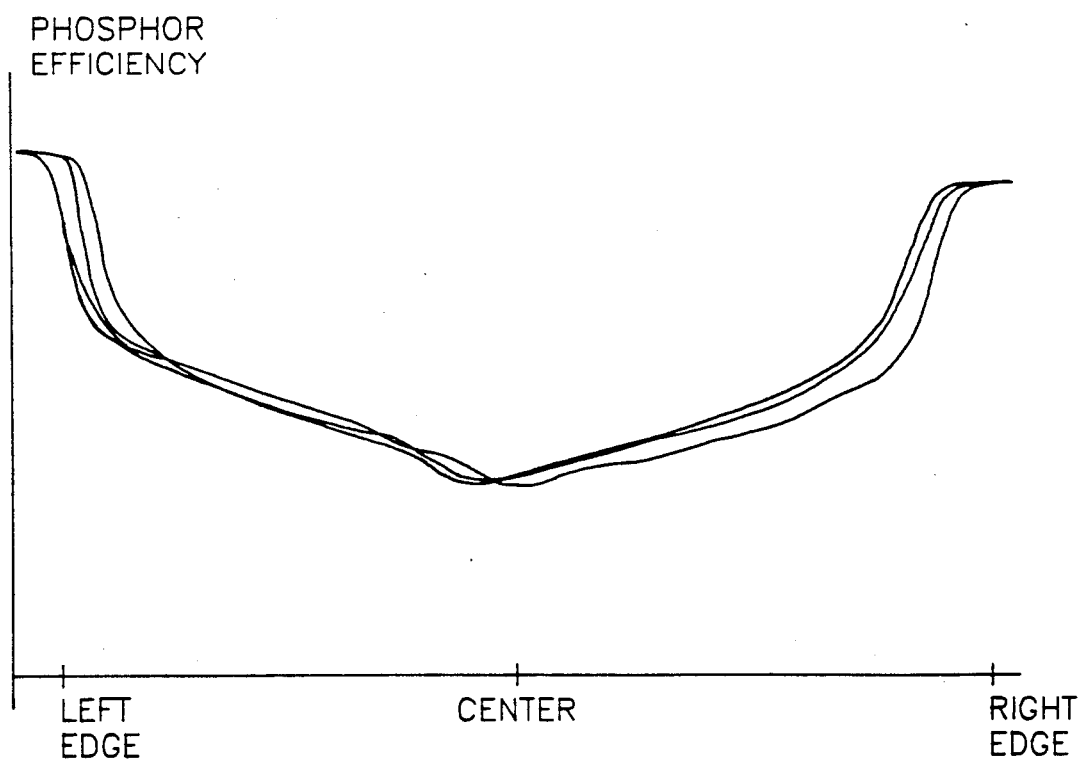
FIG. 3 is a graph of the gradient required to counter the gradient of luminous non-uniformity in the image intensifier.

In accordance with the present invention, the phosphor efficiency of the phosphor screen 20 is varied from center to edge so as to compensate for the luminous non-uniformity at the output plane 23 of the fiber optics element 22. Phosphor efficiency can be defined as the amount of light generated (in lumens) per watt of energy at a given level of voltage, such as 6 kV. Thus, by creating a gradient of phosphor efficiency across the phosphor screen 20 that is inversely proportional to the curve illustrated in FIG. 2, the luminous non-uniformity at the output plane 23 of the fiber optics element 22 can be counter-balanced and a uniform intensity distribution can be obtained. The gradient of phosphor efficiency across the phosphor screen 20 is shown in FIG. 3. The ordinate relates to the phosphor efficiency of the phosphor screen 20 and the abscissa relates to the diameter of the phosphor screen 20.

Figure 4:
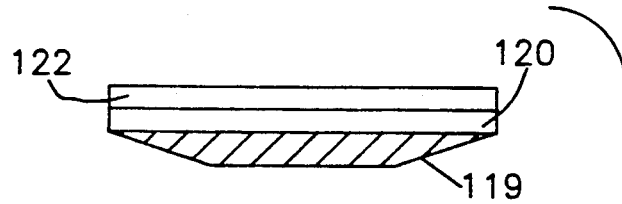
FIG. 4 is a schematic diagram of a method of applying aluminum to a lacquered phosphorous screen in accordance with the present invention.
Figure 4:
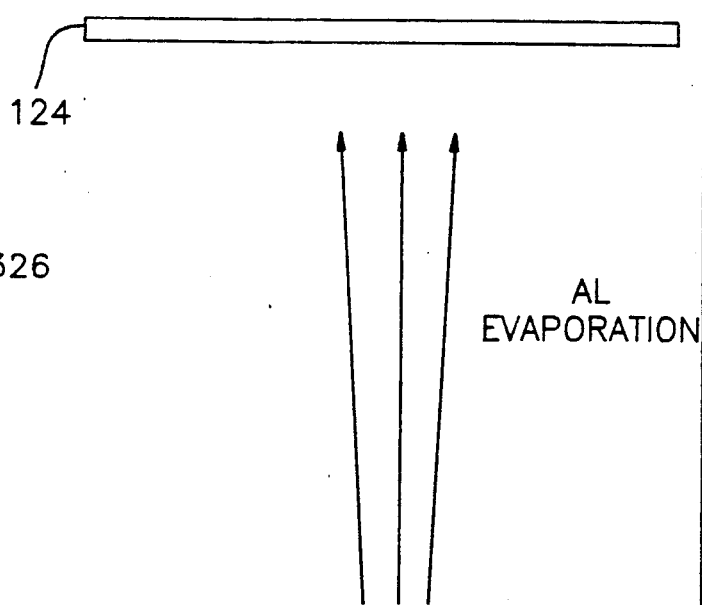

Referring now to FIG. 4, a fiber optics element 122 has a phosphor screen 120 deposited on one end thereof. A protective lacquer coat can be applied over the phosphor screen 120. A gradient of phosphor efficiency is created by depositing a film 119 of aluminum of a given thickness over the phosphor screen 120. The thickness varies from the center to the edges. The aluminum film 119 reduces the efficiency of the phosphor. Normally, when electrons strike the phosphor screen 120, they excite the phosphor, causing it to emit photons. However, after a certain optimized thickness of aluminum is deposited on the phosphor screen 120, the light output of the phosphor screen 120 begins to decrease. The aluminum film 119 provides a conductive coating. If the electrons strike the aluminum film 119, the aluminum conducts the electrons away from the phosphor. As a result, greater electron speed is required to penetrate the aluminum film 119 and excite the phosphor. Thus, the aluminum film 119 increases the "dead voltage" of the phosphor. The dead voltage is the voltage below which the electrons do not excite the phosphor. By varying the thickness of the aluminum, a gradient is created.

The aluminum film 119 also serves ancillary functions. For instance, the aluminum film 119 prevents electrons from burning away the phosphor from the phosphor screen 120. Further, when the electron strikes the phosphor screen 120, light is scattered. The aluminum film 119 reflects the photons emitted by the phosphor screen 120 into the fiber optics element 122. In this respect, the aluminum film 119 functions as a reflector.

Although aluminum is the preferred material for the film 119, any material possessing similar properties can be deposited on the phosphor screen 120. The material must have a lattice that allows electrons to penetrate the film 119 and reach the phosphor screen 120, but must also conduct away electrons. For instance, a chrome overlay has been used in conjunction with a phosphor screen 120.

Still referring to FIG. 4, the aluminum is applied to the phosphor screen 120 by an evaporation process. The lacquered phosphor screen 120 is rotated behind a gradient mask 124. On the opposite side of the mask 124 is a vessel 126, which contains aluminum. The aluminum is evaporated onto the phosphor screen 120 through the gradient mask 124. The evaporation of aluminum is a timed process with the final thickness of the aluminum film 119 being dependent upon the rate of evaporation, the total time of evaporation and the total time of exposure to the phosphor screen 120. An exemplary thickness for the film 119 is 1500 angstroms. However, if aluminum is evaporated onto the screen at a rate of 100-200 angstroms per minute, a fast exposure of roughly three minutes will yield the desired gradient. The correct thickness can be determined by a person skilled in the art.

Figure 5:
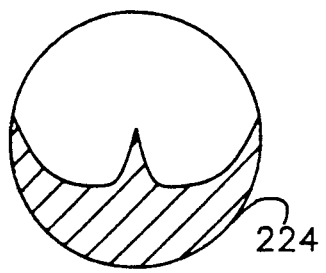
FIGS. 5–7 are top plan views of three different masks which can be used in the method illustrated in FIG. 4.

A design of a preferred mask 224 is shown in FIG. 5. As the lacquered phosphor screen 120 is rotated behind the gradient mask 224, the central portion of the phosphor screen 120 is exposed to, for instance, 310 degrees out of 360 degrees of evaporation. Dependent upon shape of the mask 224, the areas near the periphery of the phosphor screen 120 are exposed to 180 degrees of the 360 degrees, or roughly 50 percent of the aluminum evaporation. Shaping of the gradient mask 224 is determined empirically such that the shape of the aluminum film 119 matches the gradient of luminous non-uniformity of the fiber optics element 122. Sharp discontinuities in the gradient must be avoided.

Figure 6:
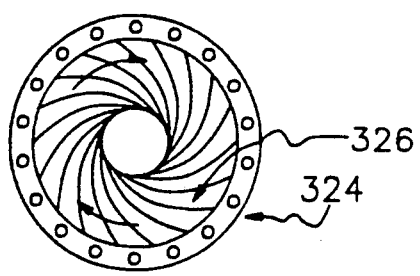

Another type of mask is an iris diaphragm mask 324, which is shown in FIG. 6. The iris diaphragm mask 324 has leaves 326 that move in opposite directions, as indicated by the arrows. The iris diaphragm mask 324 is timed to close from a fully open position to a fully closed position or vice versa. During evaporation, the iris leaves 326 slowly open in sequence with the evaporation to create a thick evaporation in the central area of the phosphor screen 120 where the phosphor screen 120 is exposed for a longer time. At the edges of the phosphor screen 120, the aluminum film 119 is thinner because of the shorter exposure time. When the iris diaphragm mask 324 is employed, the lacquered phosphor screen 120 does not have to be rotated.

Figure 7:
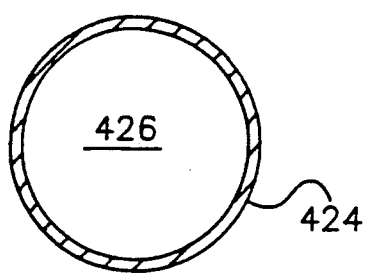

Yet another type of mask is a shadow mask 424, which is shown in FIG. 7. The shadow mask 424 is a circular mask, which has a central aperture 426. The shadow mask 424 is located at a distance from the phosphor screen 120 and vessel 126 such that the fringe of the phosphor screen 120 is not visible, but the central portion of the phosphor screen 120 is visible. The shadow mask 424 can be used for simple style corrections requiring only a small variation of light output, such as when there need be only a slight increase in phosphor efficiency near the outer periphery. The shadow mask 424 is good for correcting the luminosity gradient in an image intensifier lo that employs a straight-through optics element.

It will be understood that the embodiments described herein are merely exemplary and that a person skilled in the art may make many variations and modifications without departing from the spirit and scope of the invention. All such modifications are intended to be included within the scope of the invention as defined in the appended claims.

I claim:

1. In apparatus for converting an electron emission into visible light, said apparatus including a fiber optics element having an input plane and an output plane, and a phosphor screen deposited on said input plane, said light produced by said phosphor screen having a luminous non-uniformity at said output plane, the improvement therewith comprising a film of a material that reduces phosphor efficiency, said material being deposited on said phosphor screen such that said film compensates for said luminous non-uniformity and provides a uniform luminous distribution at said output plane of said fiber optics element.

2. An apparatus according to claim 1, wherein said film has a gradient thickness across said phosphor screen.

3. An apparatus according to claim 1, wherein said material is aluminum.

4. An apparatus according to claim 1, wherein said material is chrome.

5. An apparatus according to claim 1, wherein said fiber optics element is a twister.

6. An apparatus according to claim 1, wherein said fiber optics element has fibers that are straight.

7. In an image intensifier system having electron emission means for converting radiation into an emission of electrons, a phosphor screen, responsive to said emission means, for converting said electron emission into visible light and a fiber optics element having an input plane and an output plane, said phosphor screen being deposited on said input plane, said light produced by said phosphor screen having a luminous non-uniformity at said output plane, said improvement wherein a material that reduces phosphor efficiency is deposited on said phosphor screen, such that said material compensates for said luminous non-uniformity and provides a uniform luminous distribution at said output plane.

8. A system according to claim 7, wherein said material has a gradient thickness across said phosphor screen.

9. A system according to claim 7, wherein said material is aluminum.

10. A system according to claim 7, wherein said material is chrome.

11. A system according to claim 7, wherein said fiber optics element is a twister.

12. A system according to claim 7, wherein said fiber optics element has fibers that are straight.

13. A system according to claim 7, wherein said emission means includes photocathode means for converting electromagnetic radiation into an electron emission and objective lens means for focusing said electromagnetic radiation onto an input plane of said photocathode means, said electron emission being directed from an output of said photocathode means onto said phosphor screen.

14. A method of correcting luminous non-uniformity in a system that employs means for converting an electron emission into visible light, said means including a fiber optics element having an input plane and an output plane, and a phosphor screen deposited on said input plane, said light produced by said phosphor screen having a luminous non-screen uniformity at said output plane, said method comprising the steps of depositing a material that reduces phosphor efficiency on said phosphor screen, such that said luminous non-uniformity at said output plane is compensated for.

15. A method according to claim 14, wherein said thickness of said material is deposited as a gradient from center to edge of said phosphor screen.

16. A method according to claim 14, wherein said step of depositing said material includes the steps of
 (a) placing a mask in proximity of said phosphor screen; and
 (b) evaporating said material onto said phosphor screen through said mask.

17. A method according to claim 16, wherein said mask has a fixed design, and wherein said method further includes the step of rotating said phosphor screen during evaporation.

18. A method according to claim 16, wherein said mask has an iris diaphragm, and wherein said method further includes the step of opening and/or closing said iris diaphragm during evaporation.

19. A method according to claim 16, wherein said mask has a central aperture, and wherein said material is not evaporated onto fringes of said phosphor screen.

* * * * *